(12) United States Patent
Kimbara et al.

(10) Patent No.: US 6,605,377 B1
(45) Date of Patent: Aug. 12, 2003

(54) FUEL CELL COOLING APPARATUS AND FUEL CELL SYSTEM

(75) Inventors: Masahiko Kimbara, Kariya (JP); Yoshihiro Isogai, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 335 days.

(21) Appl. No.: 09/649,854

(22) Filed: Aug. 29, 2000

(30) Foreign Application Priority Data

Aug. 30, 1999 (JP) .......................................... 11-243183

(51) Int. Cl.[7] ............................................... H01M 8/04
(52) U.S. Cl. ............................ 429/26; 429/20; 429/33; 429/17
(58) Field of Search ........................... 429/20, 26, 33, 429/17

(56) References Cited

U.S. PATENT DOCUMENTS

| | | | |
|---|---|---|---|
| 5,034,287 A | 7/1991 | Kunz | ........................... 429/13 |
| 6,232,006 B1 * | 5/2001 | Breault | ......................... 429/26 |
| 6,277,509 B1 * | 8/2001 | Wheeler | ....................... 429/17 |
| 6,383,672 B1 * | 5/2002 | Fujita | ........................... 429/26 |

* cited by examiner

Primary Examiner—John S. Maples
(74) Attorney, Agent, or Firm—Morgan & Finnegan, LLP (57) ABSTRACT

A cooling apparatus for a fuel cell system having high cooling efficiency. The cooling apparatus includes a chemical heat pump circuit using isopropyl alcohol, acetone, and hydrogen gas as a heat carrier. The chemical heat pump circuit includes an endothermic device incorporated in the fuel cell and an exothermic device for releasing heat from the circuit. The temperature of a heat carrier is increased to a first temperature by the heat of the fuel cell. The chemical heat pump circuit uses the heat of the heat carrier after it is heated to the first temperature to heat the heat carrier to a second temperature, which is higher than the first temperature. The heat of the heat carrier is used for other useful purposes or is simply desorbed. After the heat carrier is heated to the second temperature, the heat carrier is easily cooled by a cooling fan. Thus, the cooling apparatus has a high cooling efficiency.

24 Claims, 7 Drawing Sheets

FUEL CELL COOLING APPARATUS AND FUEL CELL SYSTEM

BACKGROUND OF THE INVENTION

The present invention relates to a fuel cell cooling apparatus and a fuel cell system.

Fuel cells are efficient and compact. Among various types of fuel cells, a solid polymer electrolyte fuel cell becomes active at a relatively low temperature of 100° C. or less and can thus be applied as an electric power source for automobiles or as a home power generator.

A typical fuel cell has a relatively high power generation efficiency, since approximately 50% of the produced energy:is usable. However, the remaining 50% is waste heat. The heat must be discharged efficiently from the fuel cell to protect high molecular electrolyte films, which are located in the fuel cell. In the prior art, the fuel cell is cooled to a temperature of 100° C. or lower by a cooling apparatus having a radiator. The cooling apparatus uses coolant to transfer the waste heat of the fuel cell to the radiator. However, the difference between the temperature of the coolant heated by the waste heat (e.g., 60° C. to 80° C.) and the temperature of the ambient air about the radiator (e.g., 30° C.) is small. This decreases the heat transfer efficiency of the radiator. The radiator must thus have a large heat transfer area. This increases the size of the radiator, which in turn, increases the size of the fuel cell system.

Additionally, the temperature of the solid polymer electrolyte fuel cell is normally 100° C. or less, which is relatively low. It is thus difficult to effectively use the waste heat of the fuel cell.

SUMMARY OF THE INVENTION

It is an object of the present invention to provide a fuel cell cooling apparatus and a fuel cell system that have high cooling efficiency and enable effective usage of the waste heat.

To achieve the above object, the present invention provides a cooling apparatus for cooling a fuel cell that produces activation heat at a first temperature. The cooling apparatus has a chemical heat pump apparatus including at least one chemical heat pump for heating a heat carrier fluid to a second temperature, which is higher than the first temperature, using the activation heat. A heat transfer apparatus transfers heat from the heat carrier fluid after it has been heated to the second temperature.

A further aspect of the present invention provides a fuel cell system having a fuel cell that produces activation heat at a first temperature, and a cooling apparatus for cooling the fuel cell. The cooling apparatus includes a chemical heat pump system for heating a heat carrier fluid to a second temperature, which is higher than the first temperature, using the activation heat. A heat transfer apparatus removes heat from the heat carrier fluid after it has been heated to the second temperature. A hydrogen supply apparatus supplies the fuel cell with hydrogen gas.

Another aspect of the present invention provides a fuel cell system having a fuel cell for generating power, which is supplied to a predetermined external load, from a chemical reaction between hydrogen gas and oxygen gas. The fuel cell produces activation heat at a first temperature. A hydrogen supply apparatus supplies the fuel cell with the hydrogen gas. A chemical heat pump system produces heat at a second temperature, which is higher than the first temperature, using the activation heat. The heat carrier fluid includes a first heat carrier and a second heat carrier. The heat pump system includes a first heat pump circuit for absorbing the activation heat of the fuel cell and cooling the fuel cell. The first heat pump circuit has a first endothermic device and a first exothermic device. The first heat carrier is circulated between the endothermic device and the exothermic device. The first heat carrier receives heat from the fuel cell at the first endothermic device and is heated to the second temperature by a chemical reaction in the first endothermic device. A second heat pump circuit has a second endothermic device, which cools the first exothermic device, and a second exothermic device. The second heat carrier is circulated between the second endothermic device and the second exothermic device. The second heat carrier cools the first heat carrier at the second endothermic device, and the second heat carrier is heated at the second exothermic device to a third temperature, which is higher than the second temperature, by a chemical reaction. A heat transfer apparatus cools the second heat carrier, after the second heat carrier has been heated to the third temperature, at the second exothermic device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A fuel cell system FCS according to a first embodiment of the present invention will now be described with reference to FIGS. 1 to 5. The fuel cell system FCS is used, for example, as an automobile electric power source or a home power generator. The fuel cell system FCS includes a fuel cell 1, a hydrogen supply apparatus 2, which supplies the fuel cell 1 with hydrogen, a cooling apparatus 3, which cools the fuel cell 1, and an air supply system (not shown). The hydrogen supply apparatus 2 is of a known type, such as, a methanol reformation type, a hydrogen absorption alloy type, a liquid hydrogen type, or a high pressure hydrogen gas type.

Figure 2:
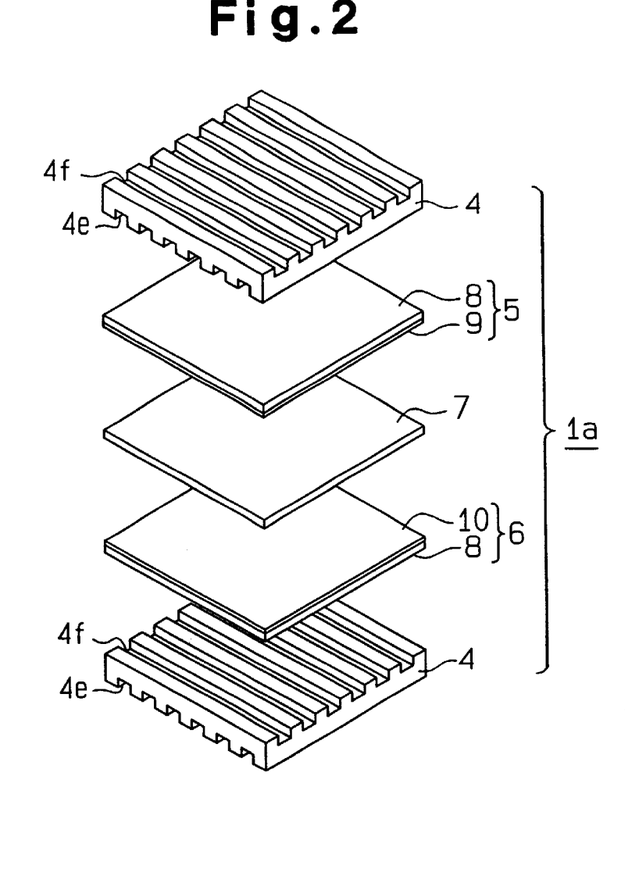
FIG. 2 is an exploded perspective view showing a unit cell of the fuel cell of FIG. 1.

The structure of the fuel cell 1 is partially shown in FIG. 2. The fuel cell 1 is a solid polymer electrolyte fuel cell and includes a plurality of unit cells 1a. The unit cells 1a each have two separators 4, which are provided with fins, a fuel electrode 5 and an air electrode 6, which are held between the separators 4, and an electrolyte film 7, which is held between the electrodes 5, 6.

The fuel electrode 5 is an anode formed by a porous support layer 8 and an anode catalytic layer 9. The air electrode is a cathode formed by a porous support layer 8 and an cathode catalytic layer 10. The fuel electrode 5 is supplied with fuel, or hydrogen, that flows through fuel grooves 4e, which are defined between the fins of the associated separator 4. The air electrode 6 is supplied with air that flows through air grooves 4f, which are defined between the fins of the associated separator 4. The flow direction of the fuel is perpendicular to that of the air. The electrolyte film 7 causes a reaction between oxygen included in the air and the hydrogen. The reaction produces electromotive force, which is applied to an external load by the fuel cell 1. The fuel cell 1 becomes active at about 80° C.

Figure 1:
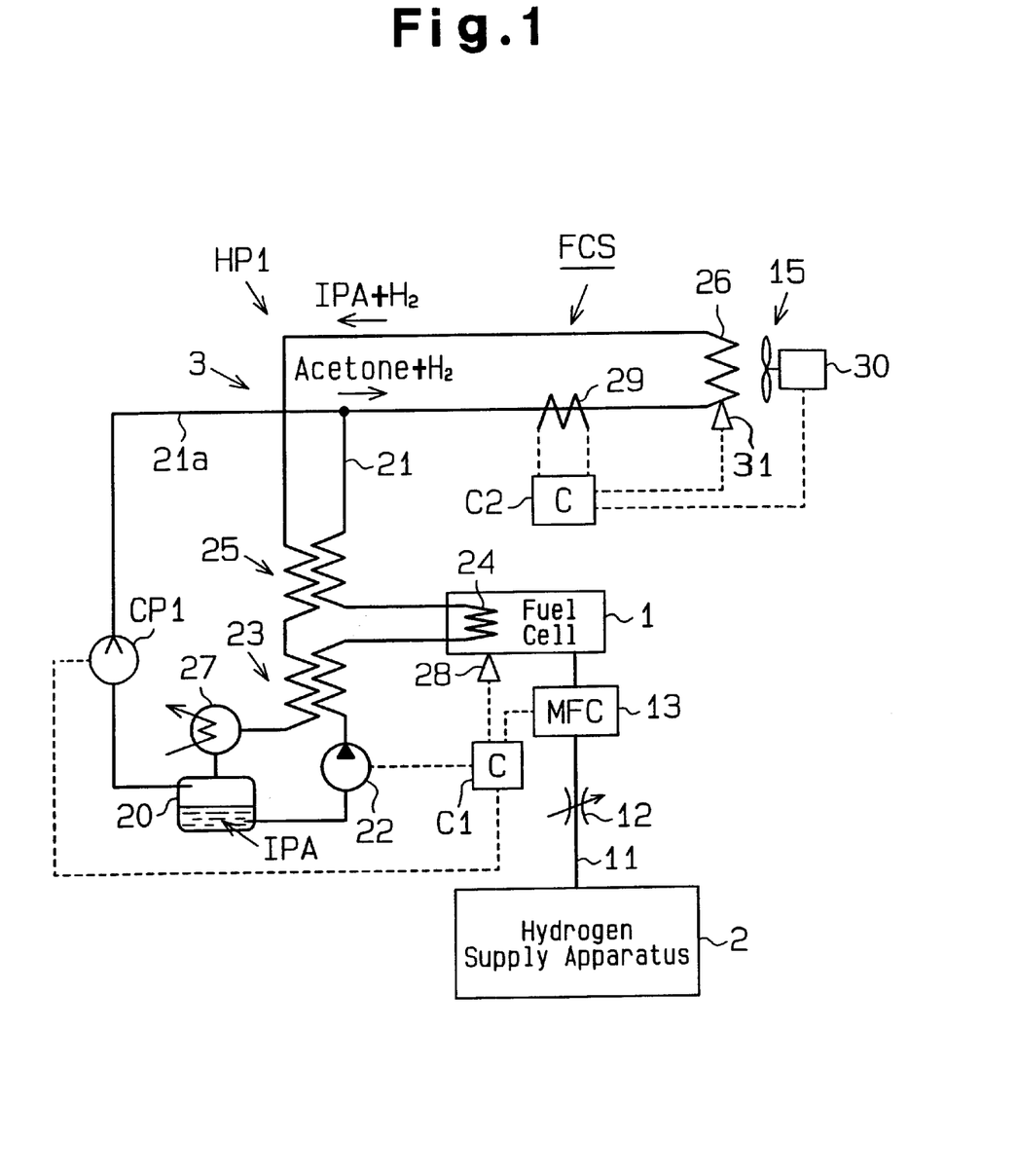
FIG. 1 is a circuit diagram showing a fuel cell system according to a first embodiment of the present invention.

The hydrogen supply apparatus 2 is connected to the fuel cell 1 by a hydrogen supply pipe 11. A pressure reducing valve 12 and a mass flow controller (MFC), or hydrogen flow rate control valve 13, are arranged in the hydrogen supply pipe 11. The hydrogen flow rate control valve 13 incorporates a flow rate detector, which detects the flow rate of the hydrogen, and a control valve, the opening size of which is adjusted when the flow rate is feedback controlled based on the detected flow rate. A fuel controller C1 determines the amount of power that is required to be generated by the fuel cell 1 in accordance with the amount of power consumption. When determining that power generation is necessary, the fuel controller C1 controls the hydrogen flow rate control valve 13 in accordance with the required amount of power generation. This supplies the fuel cell 1 with an amount of hydrogen gas corresponding to the required power generation amount. The pressure reducing valve 12 regulates the pressure of the hydrogen gas to a predetermined value.

The cooling apparatus 3 includes a chemical heat pump HP1, which cools the fuel cell 1, and a radiator 15. The chemical heat pump HP1 absorbs the heat of the fuel cell 1 and cools the fuel cell 1. Further, the chemical heat pump HP1 uses a chemical substance as a heat carrier. The chemical substance endothermically reacts at the activating temperature of the fuel cell 1 (approximately 80° C.). It is preferred that isopropyl alcohol (IPA) be used as the chemical substance. IPA cooperates with a predetermined catalyst to generate acetone and hydrogen ($H_2$) at the activating temperature of the fuel cell 1 (approximately 80° C.), which is an endothermic reaction.

The heat carrier of the chemical heat pump HP1 includes IPA, acetone, and $H_2$. The chemical heat pump HP1 absorbs heat at a relatively low temperature (the waste heat of the fuel cell 1) and releases heat at a relatively high temperature by employing an exothermic reaction that occurs between IPA, acetone, and $H_2$.

The cooling apparatus 3 absorbs the relatively low temperature heat of the heat carrier (the waste heat of the fuel cell 1) with the chemical heat pump HP1 and thus heats the heat carrier to a predetermined temperature. Heat is removed from the carrier by the radiator 15. This cools the fuel cell 1.

A dehydrogenation reaction of the IPA takes place in the chemical heat pump HP1. The dehydrogenation reaction of the IPA generates hydrogen gas and acetone ($(CH_3)_2CO$).

$(CH_3)_2CHOH$ (liq.)→$(CH_3)_2CO$ (g)+$H_2$ (g)+100.4 kJ/mol

The dehydrogenation reaction is an endothermic reaction that occurs at about 80° C. in the presence of a dehydrogenation catalyst.

To regenerate the IPA, the acetone undergoes a hydrogenation reaction.

$(CH_3)_2CO$ (g)+$H_2$ (g)→$(CH_3)_2CHOH$ (liq.)−100.4 kJ/mol

The hydrogenation reaction of the acetone is an exothermic reaction that occurs at about 200° C. in the presence of a hydrogenation catalyst.

As shown in FIG. 1, the cooling apparatus 3 includes an IPA tank 20, and a circuit 21, which extends between the IPA tank 20 and the fuel cell 1. An IPA pump 22, a low temperature heat exchanger 23, a dehydrogenation reactor (endothermic reactor) 24, a high temperature heat exchanger 25, a hydrogenation reactor (exothermic reactor) 26, and a condenser 27 are arranged in the circuit 21. The dehydrogenation reactor 24 is incorporated in the fuel cell 1.

The dehydrogenation reactor 24 incorporates a dehydrogenation catalyst. The dehydrogenation catalyst may be, for example, a fine particle metal nickel catalyst, a precious metal catalyst carried by carbon, a Raney nickel catalyst, or a nickel boride catalyst. Platinum, ruthenium, rhodium, or palladium may be used as the precious metal catalyst. The dehydrogenation reactor 24 dehydrogenates the IPA at about 80° C. The hydrogenation reactor 26 incorporates a hydrogenation catalyst. A nickel catalyst (e.g., nickel fine particles carried on activated carbon) is used as the hydrogenation catalyst.

The hydrogenation reactor 26 hydrogenates acetone and obtains an equilibrium mixture of IPA, acetone, and hydrogen gas. The sensible heat of the hydrogenation reactor 26 is used to preheat the acetone-hydrogen mixture gas flowing out of the fuel cell 1 in the high temperature heat exchanger 25 and is then used to preheat the IPA in the low temperature heat exchanger 23 before the IPA is supplied to the fuel cell 1. The equilibrium mixture is cooled by the two heat exchangers 25, 23 and the condenser 27. The condenser 27 cools and liquefies the IPA (boiling point, 82° C.) and the acetone (boiling point, 56° C.). The liquefied IPA and acetone are returned to the IPA tank 20. The hydrogen gas that did not react in the hydrogenation reactor 26 is also returned to the IPA tank 20. A bypass pipe 21a connects the IPA tank 20 to a location in the circuit 21 that is upstream of the hydrogenation reactor 26. A hydrogen compressor CP1 is arranged in the bypass pipe 21a. The pressure of the IPA tank is detected by a hydrogen pressure sensor (not shown). The cell controller C1 drives the hydrogen compressor CP1 and re-supplies the hydrogenation reactor 26 with hydrogen gas so that the pressure of the IPA tank 20 does not exceed a predetermined value.

A cell temperature sensor 28 detects the temperature of the fuel cell 1 and informs the cell controller C1 of the detected temperature. When the temperature of the fuel cell 1 reaches the activating temperature, the cell controller C1 drives the IPA pump 22. An HP heater 29 is arranged in the circuit 21 to heat the hydrogenation reactor 26. The radiator 15 includes the hydrogenation reactor 26 and a cooling fan 30, which is arranged near the hydrogenation reactor 26. A hydrogenation temperature sensor 31 detects the temperature of the hydrogenation reactor 26 and notifies an HP controller C2 of the detected temperature. The HP controller C2 controls the HP heater 29 and the cooling fan 30 and maintains the internal temperature of the hydrogenation reactor 26 at the hydrogenation reaction temperature (approximately 200° C.).

There are two ways to incorporate the dehydrogenation reactor 24 in the fuel cell 1. The first way is referred to as an interposing technique. In this technique, each separator 4 is formed from two parts, a fuel side part 4a and an air side part 4b, and the dehydrogenation reactor 24 is interposed between the two parts 4a, 4b (refer to FIG. 3). The second way is referred to an integrating technique. In this technique, each separator 4 is formed from two parts, a fuel side part 4c and an air side part 4d, and the dehydrogenation reactor 24 is formed in reaction passages (reaction grooves) defined between the two parts 4c, 4d that are connected with each other (refer to FIG. 5).

Figure 3:
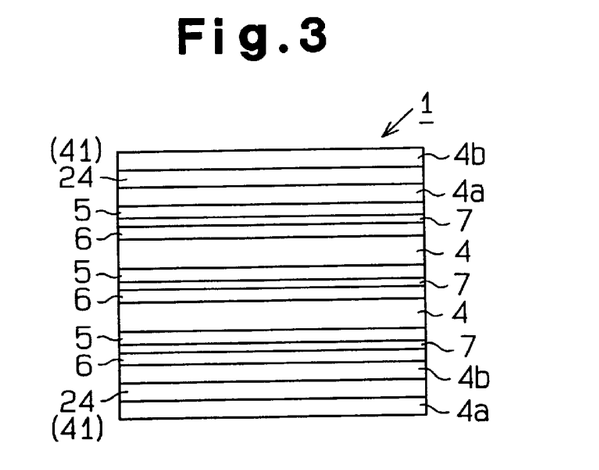
FIG. 3 is a schematic side view showing the unit cell of FIG. 1.

FIG. 3 shows the fuel cell 1 including the dehydrogenation reactor 24. The fuel cell 1 has a structure in which the separator 4, the electrodes 5, 6, the electrolyte film 7, and the dehydrogenation reactor 24 are superimposed. Each dehydrogenation reactor 24 is held between a fuel side part 4a and an air side part 4b of a separator 4.

Figure 4:
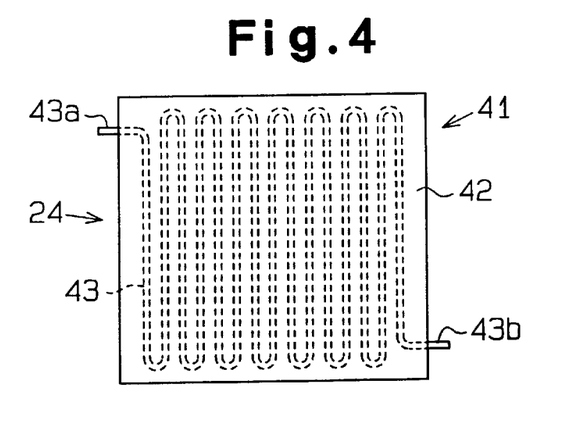
FIG. 4 is a schematic plan view showing a dehydrogenation reactor.

A tube-incorporating cooling plate 41 shown in FIG. 4, for example, is used as the dehydrogenation reactor 24. The cooling plate 41 is a press-molded product made of a metal, such as aluminum. Further, the cooling plate 41 is formed by a substrate 42 and a zigzagging tube 43 arranged in the substrate 42. The two ends of the tube 43 extend from the substrate 42 and respectively function as a fuel inlet 43a and a fuel outlet 43b. A catalyst that causes the dehydrogenation reaction is arranged in the tube 43. When the cooling plate 41 is held between the parts 4a, 4b, the tube 43 extends through the interior of the fuel cell 1.

Figure 5:
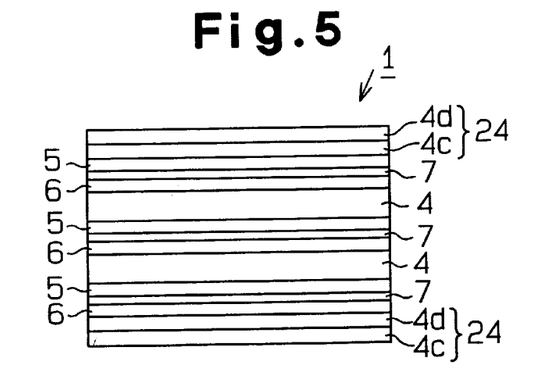
FIG. 5 is a schematic side view showing a further type of unit cell of the fuel cell.

FIG. 5 shows another fuel cell 1 including the dehydrogenation reactor 24. The dehydrogenation reactor 24 includes first and second separator parts 4c, 4d. The dehydrogenation reactor 24 also functions as the separator 4.

Figure 6:
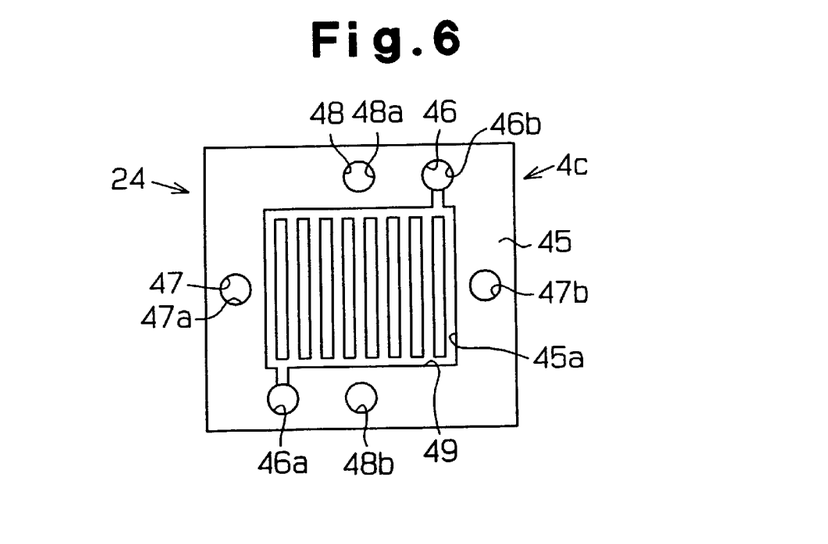
FIG. 6 is a partial schematic plan view showing a dehydrogenation reactor that differs from that of FIG. 4.

FIG. 6 is a plan view showing the first separator part 4c. The first separator part 4c is formed from, for example, a carbon substrate 45. Three flow passages, that is, a fuel passage 46, a hydrogen passage 47, and an air passage 48 extend through the surfaces of the substrate 45 at the peripheral portion of the substrate 45. The peripheral portion is not shown in FIG. 2. An inlet 46a and outlet 46b of the fuel passage 46, an inlet 47a and outlet 47b of the hydrogen passage 47, and an inlet 48a and outlet 48b of the air passage 48 are formed in one surface of the substrate 45. Further, reaction grooves 45a, which are formed in a grid-like manner and connect the inlet 46a and outlet 46b of the fuel passage 46, are formed in the opposite surface of the substrate 45. The second separator part 4d, which is connected with the first separator part 4c, is a mirror image of that of the first separator part 4c.

When the two separator parts 4c, 4d are connected with each other, the reaction grooves 45a of the first separator part 4c face the reaction grooves 45a of the second separator part 4d to form a reaction passage 49. In other words, a reaction passage 49 is formed in the dehydrogenation reactor 24. A catalyst, which causes dehydrogenation, is arranged in the reaction passage 49. The fuel grooves 4e and the air grooves 4f are formed respectively on surfaces of the separator parts 4c, 4d that are opposite to the surface of the reaction grooves 45a.

When the dehydrogenation reactor 24 is installed in the fuel cell 1, the three passages 46, 47, 48 extend through the fuel cell 1. Hydrogen gas is supplied to the associated fuel electrode 5 through the hydrogen passage 47, and air is supplied to the associated air electrode 6 through the air passage 48. IPA is supplied to the reaction passage 49 through the fuel passage 46.

In FIGS. 3 and 5, some of the separators 4 are replaced by the dehydrogenation reactors 24. If necessary, all of the separators 4 may be replaced by the dehydrogenation reactors 24.

The operation of the fuel cell system FCS will now be discussed.

When an external load produced by the automobile or power generator employing the fuel cell system FCS consumes power, the hydrogen flow rate control valve 13 is opened in accordance with the required power generation amount. This supplies the fuel electrodes 5 of the fuel cell 1 with pure hydrogen from the hydrogen supply apparatus 2 at a flow rate corresponding to the required power generation amount. Further, the air electrodes 6 are supplied with air from the air supply apparatus (not shown). As a result, the fuel cell 1 generates power.

The cell controller C1 drives the IPA pump 22 based on the temperature detected by the cell temperature sensor 28 and supplies the dehydrogenation reactors 24 with IPA at a flow rate that maintains the fuel cell 1 at an active temperature. The fuel cell 1 is cooled by the endothermic reaction that occurs in the dehydrogenation reactors 24 so that the temperature is adjusted to the activating temperature.

The heat carrier, which is heated by the waste heat of the fuel cell 1, is further heated by the chemical heat pump HP1. The heat carrier is cooled by the hydrogenation reactor 26. In other words, the hydrogenation reactor 26 functions as a radiator. The cooling fan 30 cools the hydrogenation reactor 26 so that its internal temperature is adjusted to about 200° C.

The advantages of the fuel cell system FCS according to the first embodiment will now be discussed.

(1) The dehydrogenation reactors (endothermic reactors) 24 first cause the heat carrier to absorb the waste heat of the fuel cell 1. The chemical heat pump HP1 then increases the temperature of heat carrier, and the hydrogenation reactor (exothermic reactor) 26 cools the heat carrier. The temperature of the hydrogenation reactor 26, which functions as a radiator, is about 200° C., while the ambient temperature is, for example, 30° C. to 50° C. The temperature difference is thus large. Accordingly, the hydrogenation reactor 26 is cooled efficiently by the cooling fan 30. Further, the first embodiment uses the hydrogenation reactor 26 as a radiator, which is smaller than a conventional radiator. This enables the size of the fuel cell system FCS to be decreased.

(2) The dehydrogenation reactors 24 are incorporated in the fuel cell 1. This efficiently absorbs the heat of the fuel cell 1. In other words, the fuel cell 1 is cooled efficiently.

Second to fifth embodiments according to the present invention will now be described. The description will mainly center on parts differing from the first embodiment. Like or same reference numerals are given to those components that are the same as the corresponding components of the first embodiment.

Second Embodiment

Figure 7:
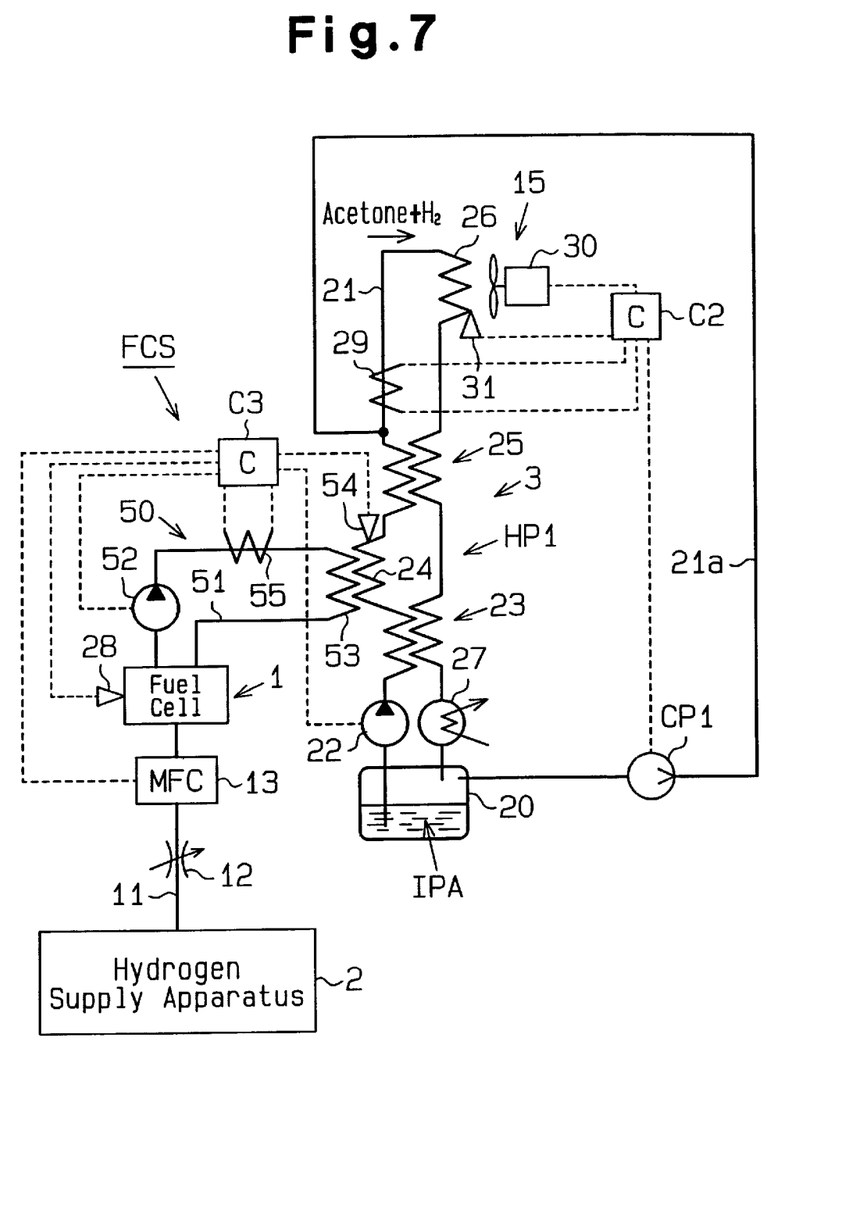
FIG. 7 is a circuit diagram showing a fuel cell system according to a second embodiment of the present invention.

FIG. 7 shows a fuel cell system FCS according to a second embodiment of the present invention. The fuel cell system FCS includes a fuel cell 1, a hydrogen supply apparatus 2, and a cooling apparatus 3. The cooling apparatus 3 is provided with a cooling circuit 50, through which coolant is circulated, and a chemical heat pump HP1, which cools the fuel cell 1 through the cooling circuit 50.

The chemical heat pump HP1 is the same as that used in the first embodiment except in that the dehydrogenation reactor 24 is located outside the fuel cell 1. The dehydrogenation reactor 24 cools a coolant flowing in a cooling circuit 50, as a result of the endothermic reaction that occurs in the dehydrogenation reactor 24.

The cooling circuit 50 includes a coolant pipe 51, a coolant pump 52, and a fin unit 53. The temperature of the coolant flowing through the fin unit 53 is about 80° C. Heat is exchanged between the fin unit 53 and the dehydrogenation reactor 24. That is, the fin unit 53 transfers the heat of the coolant, which has a temperature of about 80° C., to the dehydrogenation reactor 24. The transferred heat causes the endothermic reaction in the dehydrogenation reactor 24. A cell controller C3 checks the temperature of the fuel cell 1 based on the detection signal of the cell temperature sensor 28. After the fuel cell 1 reaches the activating temperature, the cell controller C3 drives the coolant pump 52.

A dehydrogenation temperature sensor 54 detects the internal temperature of the dehydrogenation reactor 24 and signals the detected temperature to the cell controller C3. The cell controller C3 controls a coolant heater 55, which is arranged along the coolant pipe 51, to maintain the internal temperature of the dehydrogenation reactor 24 at the dehydrogenation temperature (approximately 80° C.). The HP controller C2 controls the HP heater 29 and the cooling fan 30 based on the detection signal from the hydrogenation temperature sensor 31 to maintain the interior temperature of the hydrogenation reactor 26 at the hydrogenation reaction temperature (approximately 200° C.). The HP controller C2 controls the hydrogen compressor CP1 so that the interior pressure of the IPA tank 20 does not exceed the predetermined value and supplies the circuit 21 with the hydrogen gas in the IPA tank 20.

The hydrogen supply pipe 11 includes the pressure reducing valve 12 and the hydrogen flow rate control valve 13. The cell controller C3 controls the hydrogen flow rate control valve 13 in accordance with the required power generation amount. This supplies the fuel cell 1 with hydrogen gas, the amount of which corresponds to the required power generation, from the hydrogen supply apparatus 2 through the hydrogen supply pipe 11. The controllers C2, C3 form a single control unit for controlling the fuel cell system FCS.

In addition to advantages (1) and (2) of the first embodiment, the fuel cell system FCS of the first embodiment has the advantage described below.

(3) A conventional cooling circuit 50 may be used. Heat is transferred from the dehydrogenation reactor 24 of the chemical heat pump HP1 to the fin unit 53 of the cooling circuit 50. This arrangement efficiently removes heat from the fuel cell 1. Accordingly, special cooling plates for incorporating the dehydrogenation reactors 24 in the fuel cell 1 are not needed, and conventional cooling plates may be used.

Third Embodiment

Figure 8:
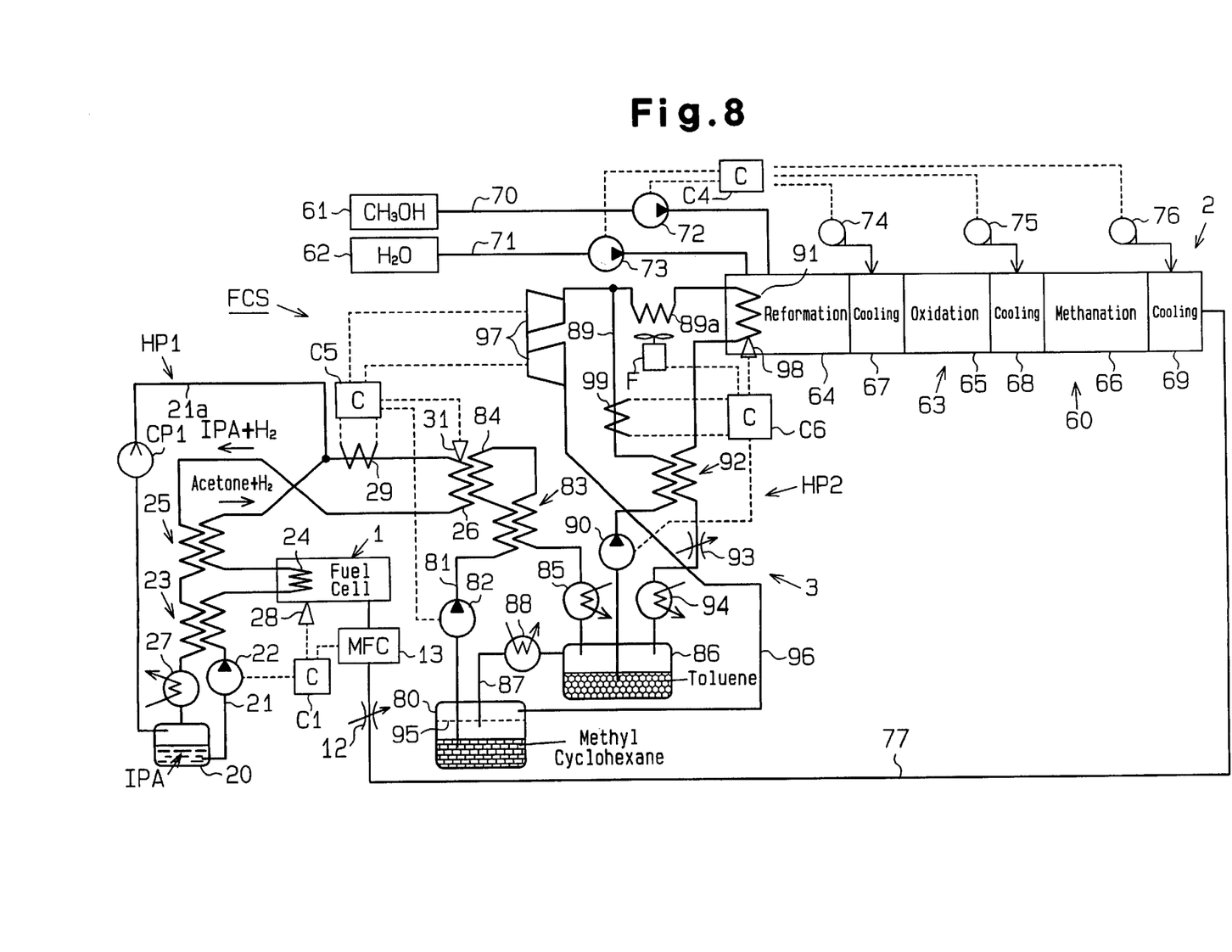
FIG. 8 is a circuit diagram showing a fuel cell system according to a third embodiment of the present invention.

A fuel cell system FCS according to a third embodiment of the present invention will now be described with reference to FIG. 8.

In the third embodiment, the hydrogen supply apparatus 2 includes a methanol reformation device 60. The waste heat of the fuel cell 1 is used as a methanol reformation heat source in the methanol reformation device 60. A chemical heat pump system includes a first chemical heat pump HP1, which cools the fuel cell 1, and a second chemical heat pump HP2, which absorbs heat from the first chemical heat pump HP1 and increases the temperature of a heat carrier of the second heat pump HP2, which is used as the heat source of the methanol reformation device.

The fuel cell system FCS includes the fuel cell 1, the hydrogen supply apparatus 2, and the cooling apparatus 3. The methanol reformation device 60 includes a raw material tank 61, in which methanol is stored, a water tank 62, in which water is stored, and a hydrogen generating apparatus 63. The hydrogen generating apparatus 63 includes a water vapor reformation reactor 64, a selective oxidation reactor 65, a methanation reactor 66 and three cooling devices 67, 68, 69 located downstream of the reactors 64, 65, 66, respectively. The tanks 61, 62 are connected to the water vapor reformation reactor 64 by a methanol supply pipe 70 and a water supply pipe 71. A methanol pump 72 and a water pump 73 are arranged in the methanol supply pipe 70 and the water supply pipe 71, respectively. Three blowers 74, 75, 76 produce air currents that cool the cooling devices 67, 68, 69, respectively. The hydrogen generation controller C4 controls the pumps 72, 73 and the blowers 74, 75, 76 based on the detection signals of temperature sensors (none shown), which detect the temperature of the reactors 64, 65, 66.

In the water vapor reformation reactor 64, methanol is decomposed based on the equation shown below.

$$CH_3OH+H_2O \rightarrow 3H_2+CO_2$$

Each of the reactors 64, 65, 66 has a heat source (not shown), such as a burner. A hydrogen supply pipe 77 connects the most downstream cooling device 69 with the fuel cell 1. The hydrogen supply pipe 77 includes the pressure reducing valve 12 and the hydrogen flow rate control valve 13. The hydrogen flow rate control valve 13 is controlled in accordance with the required power generation amount by the cell controller C1.

In the third embodiment, multiple chemical heat pump systems (in this embodiment, two) are employed to produce heat at an appropriate temperature for the methanol reformation device 60. The first chemical heat pump HP1 uses the reaction of IPA, acetone, and $H_2$. The second chemical pump HP2 uses an endothermic reaction that takes place at the temperature of the exothermic reaction in the first chemical pump HP1. More specifically, the second chemical pump HP2 uses a reaction of methylcyclohexane, toluene, and $H_2$.

Heat from the exothermic reaction in the first chemical heat pump HP1 is transferred to the endothermic reaction in the second chemical heat pump HP2. When the temperature of the exothermic reaction in the first chemical pump HP2 increases, the second chemical heat pump HP2 supplies the methanol reformation device 60 with heat.

Methylcyclohexane $C_6H_{11}CH_3$ is dehydrogenated as shown by the next equation and separated into toluene $C_6H_5CH_3$ and hydrogen $H_2$.

$$C_6H_{11}CH_3\ (g) \rightarrow C_6H_5CH_3\ (g) + 3H_2\ (g) + 204.8\ kJ/mol$$

The dehydrogenation reaction is an endothermic reaction that takes place at about 200° C.

$$C_6H_5CH_3\ (g) + 3H_2\ (g) \rightarrow C_6H_{11}CH_3\ (g) - 204.8\ kJ/mol$$

The hydrogenation reaction is an exothermic reaction that takes place at about 350° C.

The structure of the first chemical pump HP1 is similar to that of the first embodiment and includes the IPA tank 20, the circuit 21 extending between the IPA tank 20 and the interior of the fuel cell 1, the IPA pump 22 arranged in the circuit 21, the low temperature heat exchanger 23, the dehydrogenation reactor (endothermic reactor) 24, the high temperature heat exchanger 25, the hydrogenation reactor (exothermic reactor) 26, and the condenser 27. The dehydrogenation reactor 24 is incorporated in the fuel cell 1 (refer to FIGS. 4 and 6). A heat exchange controller C5 controls the heater 29 and maintains the interior temperature of the hydrogenation reactor 26 at the hydrogenation reaction temperature (approximately 200° C.).

The second chemical heat pump HP2 will now be discussed.

The second chemical heat pump HP2 includes a dehydrogenation circuit and a hydrogenation circuit.

The dehydrogenation circuit includes a methylcyclohexane separator 80, an MCH pump 82, a heat exchanger 83, and a dehydrogenation pipe 81, which includes a dehydrogenation reactor 84 and a toluene condenser 85. A dehydrogenation catalyst is arranged in the dehydrogenation reactor 84. Platinum carried alumina, for example, is used as the dehydrogenation catalyst.

In the dehydrogenation reactor 84, methylcyclohexane is dehydrogenated using the waste heat of the first chemical heat pump HP1 as a heat source to generate a toluene-hydrogen mixture gas. That is, the endothermic reaction in the dehydrogenation reactor 84 is caused by the heat energy (approximately 200° C.) of the hydrogenation reactor 26. The heat exchange controller C5 controls the HP heater 29 in accordance with the signal of the hydrogenation temperature sensor 31 and maintains the internal temperature of the dehydrogenation reactor 84 at the dehydrogenation reaction temperature (approximately 200° C.). The sensible heat of the mixture gas produced by the dehydrogenation reactor 84 is used to preheat the methylcyclohexane in the heat exchanger 83. The toluene condenser 85 liquefies the toluene gas (boiling point, 111° C.). A toluene separator 86 separates the liquefied toluene from the mixture gas and stores the liquefied toluene. The mixture gas, from which the liquefied toluene is separated, is cooled by a condenser 88 arranged in a gas pipe 87 and sent to the methylcyclohexane separator 80.

The hydrogenation circuit includes the toluene separator 86, a toluene pump 90, a radiator 89a, a hydrogenation reactor 91, a heat exchanger 92, and a hydrogen pipe 89, which is provided with a pressure reducing valve 93 and a condenser 94. A cooling fan F is arranged in the vicinity of the radiator 89a. The methylcyclohexane separator 80 has a hydrogen separation film (hydrogen permeation film) 95. The hydrogen gas pipe 96 connects a chamber downstream of the hydrogen separation film 95 to a location upstream of the hydrogenation reactor 91. Two compressors 97 are arranged in the hydrogen gas pipe 96. Hydrogen gas is compressed to, for example, 20 atmospheres by the two compressors 97 and supplied to the hydrogenation reactor 91. A hydrogenation temperature sensor 98 detects the temperature of the hydrogenation reactor 91 and signals the detected temperature to the hydrogenation controller C6. A hydrogenation controller C6 controls a hydrogenation heater 99 and the cooling fan F, which are arranged in the hydrogen pipe 89, and maintains the internal temperature of the hydrogenation reactor 91 at about 350° C. (hydrogenation reaction temperature).

At least part of the hydrogenation reactor 91 is exposed to the interior of the water vapor reformation reactor 64. Heat from the hydrogenation reactor 91 is used as a heat source for water vapor reformation of methanol in the water vapor reformation reactor 64. A hydrogenation catalyst is carried in the hydrogenation reactor 91. Platinum carried by alumina is used, for example, as the hydrogenation catalyst. The hydrogenation reactor 91 hydrogenates toluene (exothermic reaction, about 350° C.) and produces an equilibrium mixture gas of methylcyclohexane, toluene, and hydrogen. The sensible heat of the equilibrium mixture gas is used to preheat the liquefied toluene in the heat exchanger 92. The equilibrium mixture gas is cooled when flowing through the heat exchanger 92 and depressurized by the pressure reducing valve 93. The toluene gas (boiling point, 111° C.) in the equilibrium mixture gas is liquefied by the condenser 94. The liquefied toluene and the remaining mixture gas is returned to the toluene separator 86.

The toluene separator 86 separates the liquefied toluene from the mixture gas and stores the liquefied toluene. Methylcyclohexane gas (boiling point, 101° C.) is liquefied by the condenser 88 in the gas pipe 87. The liquefied methylcyclohexane is stored in the methylcyclohexane separator 80. The controllers C1, C4, C5, C6 form a single control unit. The hydrogenation reactor 91 and the water vapor reformation reactor 64 form a cooling apparatus.

The third embodiment has the advantage described below.

(4) The heat carrier of the first chemical heat pump HP1 is heated to a temperature of approximately 80° C. by the fuel cell 1 and is further heated to a temperature of approximately 200° C. by the first chemical heat pump HP1. The carrier of the first heat pump HP1 then heats the carrier of the second heat pump HP2. Then, the carrier of the second heat pump HP2 is heated to a temperature of approximately 350° C. by the second chemical heat pump HP2. Excess heat is removed by the radiator 89a. Heat energy from the carrier of the second heat pump HP2 is used as the heat source of the water vapor reformation reactor 64. That is, the fuel cell 1 is efficiently cooled by the endothermic reaction in the first chemical heat pump HP1. Further, the heat energy of the fuel cell 1 is effectively used as the heat source of the water vapor reformation reactor 64. This improves the power generating efficiency of the fuel cell system FCS. When heating the carrier of the second heat pump HP2, the temperature of the heat carrier in the first chemical heat pump HP1 is approximately 200° C., and the temperature of the heat carrier in the second chemical heat pump HP2 is approximately 350° C. when it heats the reformation reactor 64. Thus, the difference between the heat carrier temperature and the ambient temperature is large. This permits improved heat transfer at the two hydrogenation reactors 26, 91 and at the radiator 89a. Accordingly, the hydrogenation reactors 26, 91 and the radiator 89a can be made more compact.

Fourth Embodiment

Figure 9:
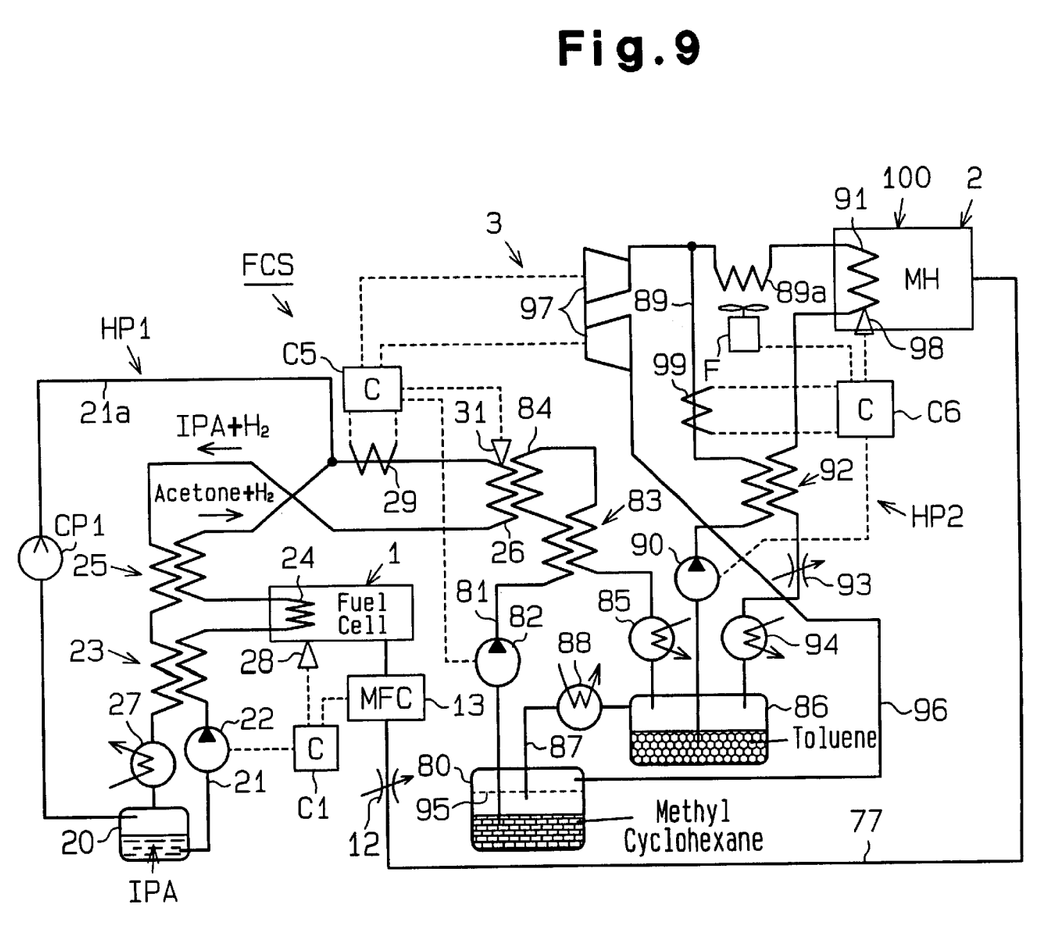
FIG. 9 is a circuit diagram showing a fuel cell system according to a fourth embodiment of the present invention.

A fuel cell system FCS according to a fourth embodiment of the present invention will now be described with reference to FIG. 9.

In the fourth embodiment, the hydrogen supply apparatus 2 incorporates a hydrogen absorption alloy reactor 100, which has a hydrogen absorption alloy. Otherwise, the structure of the fuel cell system FCS is the same as that of the third embodiment. The temperature of the carrier flowing from the fuel cell 1 is increased by the multiple (two) chemical heat pumps HP1, HP2 and then the heat of the fuel cell 1 is used to cause a hydrogen desiorb reaction in the hydrogen absorption alloy.

$Mg_2NiH_4$ is used as the hydrogen absorption alloy. The equilibrium decomposition pressure of $Mg_2NiH_4$ is one atmosphere at 252° C. and ten atmospheres at 352° C. In other words, the hydrogen absorption alloy $Mg_2NiH_4$ desorbs hydrogen at approximately ten atmospheres when heated to about 350° C.

A hydrogen absorption alloy reactor 100 is connected to the fuel cell 1 by a hydrogen supply pipe 77. A pressure reducing valve 12 and a hydrogen flow rate control valve 13 are arranged in the hydrogen supply pipe 77. A cell controller C1 controls the hydrogen flow rate control valve 13 in accordance with the required power generation amount.

The two chemical heat pumps HP1, HP2 are employed to provide the hydrogen absorption alloy reactor 100 with heat energy at an appropriate temperature. The first chemical heat pump HP1, which cools the fuel cell 1, is an IPA/acetone/$H_2$ chemical heat pump, and the second chemical heat pump HP2 is a methylcyclohexane/toluene/$H_2$ chemical heat pump.

A hydrogenation reactor 91 of the second chemical heat pump HP2 is arranged in the hydrogen absorption alloy reactor 100. The hydrogenation reactor 91 heats the hydrogen absorption alloy reactor 100 to approximately 350° C. The heat causes a hydrogen desorb reaction in the hydrogen absorption alloy reactor 100.

The fourth embodiment has the advantage described below.

(5) The heat carrier of the first heat pump HP1 is heated by the waste heat of the fuel cell 1 to a temperature of approximately 80° C. and is further heated by the first chemical heat pump HP1 to a temperature of approximately 200° C. Then, the carrier of the first heat pump HP1 heats the carrier of the second heat pump HP2, and the heat carrier of the second heat pump HP2 is further heated by the second chemical heat pump HP2 to a temperature of approximately 350° C. to heat the hydrogen absorption alloy reactor 100. Accordingly, the fuel cell 1 is efficiently cooled by the endothermic reaction of the first chemical heat pump HP1. Further, the waste heat of the fuel cell 1 is used effectively by the hydrogen absorption alloy reactor 100. This improves the power generating efficiency of the fuel cell system FCS. In addition, when transferring heat to the carrier of the second heat pump HP2, the temperature of the heat carrier in the first chemical heat pump HP1 is approximately 200° C. The temperature of the heat carrier in the second chemical heat pump HP2 is approximately 350° C. when it heats the absorption alloy reactor 100. Thus, the difference between the temperature of the heat carrier of the second heat pump HP2 and the ambient temperature is large. This improves the transfer of heat from the two hydrogenation reactors 26, 91. Accordingly, the hydrogenation reactors 26, 91 can be made more compact.

Fifth Embodiment

Figure 10:
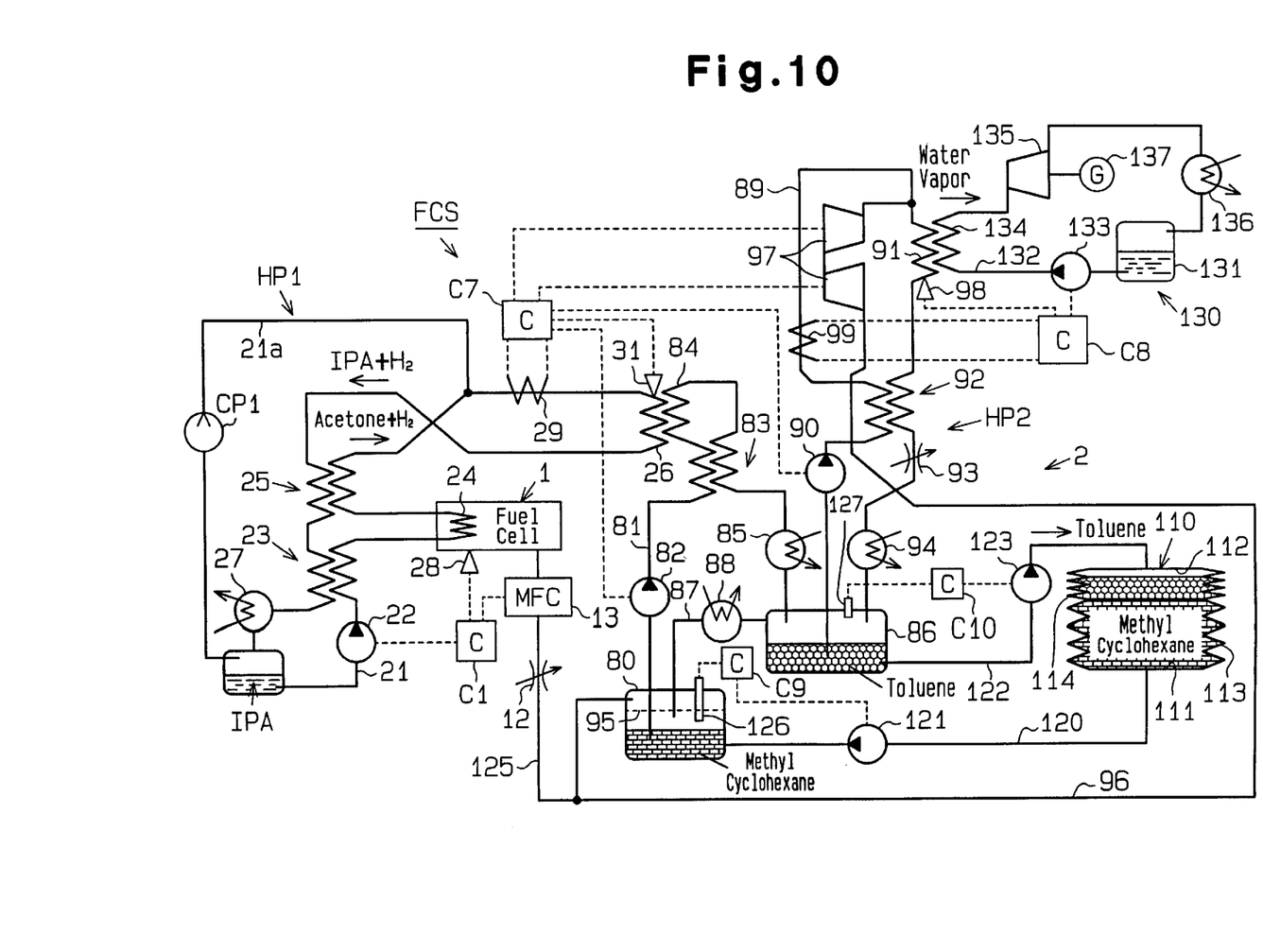
FIG. 10 is a circuit diagram showing a fuel cell system according to a fifth embodiment of the present invention.

A fuel cell system FCS according to a fifth embodiment of the present invention will now be discussed with reference to FIG. 10.

The fuel cell system FCS uses a hydrogen-containing organic compound (methylcyclohexane) as fuel to generate hydrogen gas by causing a dehydrogenation reaction of the hydrogen-containing organic compound. The organic by-product resulting from the dehydrogenation reaction is stored by the fuel cell system FCS.

In the same manner as the third and fourth embodiments, the fuel cell system FCS has a chemical heat pump system formed by a first chemical heat pump HP1, which cools the fuel cell 1, and a second chemical heat pump HP2. The first chemical heat pump HP1 is an IPA/acetone/$H_2$ chemical heat pump, and the second chemical heat pump HP2 is a methylcyclohexane/toluene/$H_2$ chemical heat pump.

In the fifth embodiment, methylcyclohexane is used as fuel for generating hydrogen gas. In the second chemical heat pump HP2, the dehydrogenation reaction of methylcyclohexane takes place in a dehydrogenation reactor (endothermic reactor). A hydrogenation reaction for reproducing fuel from toluene, which is a by-product of the dehydrogenation reaction, takes place in a hydrogenation reactor (exothermic reactor). The methylcyclohexane is consumed to produce hydrogen gas in the dehydrogenation reactor. Some of the toluene, which is a by-product of the dehydrogenation reaction, is used to reproduce fuel in the hydrogenation reactor. The heat of the second chemical heat pump HP2 is used to generate power.

The first chemical heat pump HP1 is the same as that of the third and fourth embodiments. The heat carrier, which is heated to a temperature of approximately 200° C. by the first chemical heat pump HP1, is used to cause dehydrogenation of the methylcyclohexane.

The second chemical heat pump HP2 is basically the same as that of the third and fourth embodiments. The difference is in a fuel tank 110. The fuel tank 110 has a fuel chamber 111, in which the fuel (methylcyclohexane) supplied to the methylcyclohexane separator 80 is stored, and a recovery chamber 112, in which the by-product (toluene) of the toluene separator 86 is recovered. The fuel chamber 111 is connected to the methylcyclohexane separator 80 by a fuel pipe 120. The toluene separator 86 is connected to the recovery chamber 112 of the fuel tank 110 by the recovery pipe 122. A recovery pipe 122 is arranged in the recovery pump 123.

The fuel tank 110 is formed by an extensible lower container 113 and an extensible upper container 114. The fuel and recovery chambers 111, 112 are defined in the upper and lower containers 113, 114, respectively. The fuel chamber 111 stores methylcyclohexane, and the recovery chamber 112 stores toluene. Methylcyclohexane and toluene are liquids under normal temperatures.

In the methylcyclohexane separator 80, a chamber downstream to the hydrogen separation film 95 is connected to the fuel cell 1 by a hydrogen supply pipe 125. The hydrogen flow rate control valve 13 is controlled by the cell controller C1 in accordance with the required power generation amount. This supplies the fuel cell 1 with hydrogen at a flow rate corresponding to the required power generation amount. The hydrogen gas pipe 96 connects the hydrogen supply pipe 125 and the upstream side of the hydrogenation reactor 91. Some of the hydrogen gas is supplied to the hydrogenation reactor 91 by the hydrogen gas pipe 96.

An HP controller C7 controls the HP heater 29 based on the detection signal of the hydrogenation temperature sensor 31 so that the temperature of the hydrogenation reactor 26 is maintained at about 200° C. When the temperature of the hydrogenation reactor 26 reaches a predetermined value, the HP controller C7 drives the MCH pump 82 and supplies the dehydrogenation reactor 84 with methylcyclohexane. In the dehydrogenation reactor 84, the dehydrogenation reaction of the methylcyclohexane generates hydrogen.

A power generation controller C8 controls the dehydrogenation heater 99 based on the detection signal of the hydrogenation temperature sensor 98. When the temperature of the hydrogenation reactor 91 reaches a predetermined value, the HP controller C7 drives the toluene pump 90 and supplies the hydrogenation reactor 91 with toluene. Simultaneously, the HP controller C7 drives the two compressors 97 and supplies the hydrogenation reactor 91 with compressed hydrogen gas.

The fuel (methylcyclohexane) in the methylcyclohexane separator 80 decreases in accordance with the amount of hydrogen gas supplied to the fuel cell 1. The by-product (toluene) in the toluene separator 86 increases in accordance with the amount of hydrogen gas supplied to the fuel cell 1. An MCH liquid surface sensor 126 detects the amount of methylcyclohexane in the methylcyclohexane separator 80 and signals the detected amount to a fuel controller C9. The fuel controller C9 drives the fuel pump 121 when the amount of methylcyclohexane becomes lower than a predetermined value to supply methylcyclohexane from the fuel chamber 111 to the methylcyclohexane separator 80. Thus, the methylcyclohexane separator 80 always contains a predetermined amount or more of methylcyclohexane liquid.

A toluene liquid surface sensor 127 detects the amount of toluene in the toluene separator 86 and signals the detected amount to a recovery controller C10. The recovery controller C10 drives the recovery pump 123 so that the amount of toluene in the toluene separator 86 does not exceed a predetermined value and recovers the toluene from the toluene separator 86 in the recovery chamber 112.

The waste heat of heat of the hydrogenation reactor 91 is used as a heat source for a power generation system 130. The power generation system 130 includes a water tank 131 and a water circuit 132. A water pump 133, a water vapor generator (heat receiving device) 134, a scroll expansion device 135, and a power generation device 137 are arranged in the water circuit 132.

The hydrogenation temperature sensor 98 detects the temperature of the hydrogenation reactor 91 and signals the detected temperature to the power generation controller C8. The power generation controller C8 controls the water pump 133 based on the detection signal of the hydrogenation temperature sensor 98. The water vapor generator 134 uses the reaction heat in the hydrogenation reactor 91 as a heat source to produce water vapor and supplies the water vapor to the scroll expansion device 135. The scroll expansion device 135 is driven by the water vapor. This drives the power generation device 137 and generates power. The electric power generated by the power generation device 137 is stored in a battery (not shown) as the electric power of the fuel cell system FCS.

The controllers C1, C7–C10 form a control unit for controlling the fuel cell system FCS. A cooling apparatus of the chemical heat pump system (HP1, H2) is formed by the hydrogenation reactor 91 and the power generation system 130. A cooling apparatus of the first chemical heat pump HP1 is formed by the hydrogenation reactor 26 and the dehydrogenation reactor 84.

In addition to the advantages of the fourth embodiment, the fifth embodiment has the advantages described below.

(6) Heat from the heat carrier of the first heat pump HP1, which is heated to a temperature of about 200° C. by the first chemical heat pump HP1, is used to cause the dehydrogenation reaction. Thus, the heat of the fuel cell 1 is used effectively. A single circuit is used to produce the hydrogen gas supplied to the fuel cell and to increase the temperature of the heat carrier of the second heat pump HP2. This simplifies the structure of the fuel cell system FCS.

The power generation system 130 uses the heat of the fuel cell 1 to generate and store power for the fuel cell system FCS. This improves the total efficiency of the fuel cell system FCS.

It should be apparent to those skilled in the art that the present invention may be embodied in many other specific forms without departing from the spirit or scope of the invention. Particularly, it should be understood that the present invention may be embodied in the following forms.

The fluid (heat carrier) used by the chemical heat pump HP1 is not limited to IPA and may be any chemical substance that causes endothermic reaction at the activating temperature of the fuel cell 1.

The heat carrier of the second chemical heat pump HP2 is not limited to methylcyclohexane, toluene, and $H_2$. For example, cyclohexane, benzene, and $H_2$. As long as an endothermic reaction, which absorbs heat, occurs at the activating temperature of the fuel cell 1, any type of heat pump may be used as the first chemical heat pump HP1. A chemical heat pump that does not cause hydrogenation or dehydrogenation may also be used. However, it is preferred that the heat carrier be a fluid.

In the third to fifth embodiments, a coolant circulation type cooling apparatus for cooling the fuel cell 1 may be used. In this case, a chemical heat pump having an endothermic reactor that transfers heat with a radiator of a coolant circulation type cooling apparatus is formed.

The heat carrier heated by the waste heat of the fuel cell 1 and then by at least one of the chemical pumps HP1, HP2 need not be used only as the heat source for hydrogenation reaction, the heat source for a heating device, or the heat source for a power generating device. In addition to the generation of electric power, a heating device using the waste heat of the fuel cell 1 may be used to generate, for example, power of auxiliary devices. The waste heat of the fuel cell 1 may be used to generate electric power with a thermic power generation device using, for example, the Seebeck effect.

In the first and second embodiments, a power generation system having a thermic power generation device in lieu of a radiator may be used in the chemical heat pump HP1.

In the fifth embodiment, the second chemical heat pump HP2 excluding the dehydrogenation reactor 84 may be omitted. In this case, the heat of the fuel cell 1 is used as a heat source for causing dehydrogenation reaction of the fuel in the dehydrogenation reactor 84.

In the fifth embodiment, a radiator using the hydrogenation reactor 91 and a cooling fan may be used in lieu of the power generation system.

A mechanical heat pump may be used in an auxiliary manner to increase the temperature of the heat carrier that has been heated by the fuel cell 1.

More than three chemical heat pumps may be used.

In addition to an automobile power source and a home power generator, the fuel cell system FCS may be applied to any type of apparatus using a fuel cell 1.

The present examples and embodiments are to be considered as illustrative and not restrictive, and the invention is not to be limited to the details given herein, but may be modified within the scope and equivalence of the appended claims.

What is claimed is:

1. A fuel cell system comprising:
    a fuel cell that produces activation heat at a first temperature;
    a cooling apparatus for cooling the fuel cell, wherein the cooling apparatus includes a chemical heat pump system for heating a heat carrier fluid to a second temperature, which is higher than the first temperature, using the activation heat, and a heat transfer apparatus for removing heat from the heat carrier fluid after it has been heated to the second temperature; and a hydrogen supply apparatus for supplying the fuel cell with hydrogen gas.

2. The fuel cell system according to claim 1, wherein the hydrogen supply apparatus uses heat from the heat carrier fluid, after the carrier fluid is heated to the second temperature, to generate hydrogen gas.

3. The fuel cell system according to claim 2, wherein the chemical heat pump system includes a low temperature chemical heat pump and a high temperature chemical heat pump, wherein the high temperature chemical heat pump has an exothermic reactor for heating the heat carrier fluid to the second temperature, wherein the heat transfer apparatus includes the exothermic reactor and a hydrogenation reactor, which is arranged to receive heat from the exothermic reactor, wherein the heat of the heat carrier fluid is used by the hydrogenation reactor as a heat source for producing hydrogen after being heated to the second temperature.

4. The fuel cell system according to claim 3, wherein the hydrogen supply apparatus includes a fuel reformation device for producing hydrogen gas by using heat from the heat carrier fluid to reform a hydrocarbon compound after the heat carrier is heated to the second temperature.

5. The fuel cell system according to claim 2, wherein the hydrogen supply apparatus includes a hydrogenation reactor, which accommodates a hydrogen absorption alloy, wherein the hydrogen absorption alloy receives heat from the hydrogenation reactor to desorb absorbed hydrogen gas and supply the desorbed hydrogen gas to the fuel cell.

6. The fuel cell system according to claim 1, wherein the chemical heat pump system includes:
a dehydrogenation reactor for heating organic compound fuel to a temperature higher than the first temperature and for producing hydrogen gas and a by-product;
an exothermic reactor for producing heat by causing a reaction between some of the by-product and some of the hydrogen gas, wherein the exothermic reactor is connected to the dehydrogenation reactor so that some of the heat produced by the exothermic reactor is used to heat the dehydrogenation reactor; and
a liquid container for liquefying and storing the by-product, wherein the hydrogen supply apparatus supplies the fuel cell with the hydrogen gas produced in the heat pump system.

7. The fuel cell system according to claim 6, wherein the hydrogen supply apparatus includes a low temperature chemical heat pump and a high temperature chemical heat pump, wherein the high temperature chemical heat pump uses the dehydrogenation reactor to cause an endothermic reaction and uses the hydrogenation reactor to cause an exothermic reaction.

8. The fuel cell system according to claim 1, wherein the heat transfer apparatus includes a power generation apparatus for generating electric energy using heat from the heat carrier fluid after the heat carrier fluid is heated to the second temperature.

9. A cooling apparatus for cooling a fuel cell that produces activation heat at a first temperature, the cooling apparatus comprising:
a chemical heat pump apparatus including at least one chemical heat pump for heating a heat carrier fluid to a second temperature, which is higher than the first temperature, using the activation heat; and
a heat transfer apparatus for transferring heat from the heat carrier fluid after it has been heated to the second temperature.

10. The cooling apparatus according to claim 1, wherein the chemical heat pump includes:
an endothermic reactor for cooling the fuel cell; and
an exothermic reactor connected to the endothermic reactor, wherein heat carrier fluid circulates between the endothermic reactor and the exothermic reactor, and an endothermic chemical reaction takes place in the endothermic reactor, which absorbs heat from the fuel cell, and an exothermic reaction takes place in the exothermic reactor.

11. The cooling apparatus according to claim 1, further comprising a coolant pipe, through which coolant flows, arranged to contact and cool the fuel cell, wherein the chemical heat pump includes:
an endothermic reactor for receiving heat produced by the fuel cell from the coolant; and
an exothermic reactor connected to the endothermic reactor, wherein heat carrier fluid circulates between the endothermic reactor and the exothermic reactor, and an endothermic chemical reaction takes place in the endothermic reactor, which absorbs heat from the fuel cell, and an exothermic reaction takes place in the exothermic reactor.

12. The cooling apparatus according to claim 9, wherein the chemical heat pump is one of a plurality of chemical heat pumps in the chemical heat pump apparatus.

13. The cooling apparatus according to claim 9, wherein the heat transfer apparatus includes a power generator for generating electricity using the heat from the heat carrier fluid.

14. A fuel cell system comprising:
a fuel cell for generating power, which is supplied to a predetermined external load, from a chemical reaction between hydrogen gas and oxygen gas, wherein the fuel cell produces activation heat at a first temperature;
a hydrogen supply apparatus for supplying the fuel cell with the hydrogen gas;
a chemical heat pump system for producing heat at a second temperature, which is higher than the first temperature, using the activation heat, the heat pump system including:
a first heat pump circuit for absorbing the activation heat of the fuel cell and cooling the fuel cell, wherein the first heat pump circuit has a first endothermic device and a first exothermic device, a first heat carrier being circulated between the endothermic device and the exothermic device, wherein the first heat carrier receives heat from the fuel cell at the first endothermic device and is heated to the second temperature by a chemical reaction in the first endothermic device; and
a second heat pump circuit having a second endothermic device, which cools the first exothermic device, and a second exothermic device, wherein a second heat carrier is circulated between the second endothermic device and the second exothermic device, wherein the second heat carrier cools the first heat carrier at the second endothermic device, and the second heat carrier is heated at the second exothermic device to a third temperature, which is higher than the second temperature, by a chemical reaction; and
a heat transfer apparatus for cooling the second heat carrier, after the second heat carrier has been heated to the third temperature, at the second exothermic device.

15. The fuel cell system according to claim 14, wherein the second endothermic device produces hydrogen gas and a by-product from the second heat carrier, and the second heat pump circuit further has a hydrogen separation unit for separating the hydrogen gas and the by-product.

16. The fuel cell system according to claim 15, wherein the hydrogen separation unit has a condenser for liquefying the by-product, a collection tank for collecting the liquefied by-product, and a hydrogen gas permeation film for allowing the permeation of only the hydrogen gas.

17. The fuel cell system according to claim 16, wherein the hydrogen separation unit supplies the fuel cell with hydrogen gas.

18. The fuel cell system according to claim 15, wherein the second exothermic device is supplied with the separated hydrogen gas and the by-product and hydrogenates the by-product to produce heat, which is used to heat the second heat carrier to the third temperature.

19. The fuel cell system according to claim 18, wherein the heat discharging apparatus uses heat from the second heat carrier to reform hydrocarbon and generate the hydrogen gas.

20. The fuel cell system according to claim 18, wherein the hydrogen supply apparatus includes a hydrogenation reactor, which accommodates a hydrogen absorption alloy, wherein the hydrogen absorption alloy receives heat from the hydrogenation reactor to desorb absorbed hydrogen gas and to supply the fuel cell with the desorbed hydrogen gas.

21. The fuel cell system according to claim 18, wherein the heat transfer apparatus includes a power generation apparatus for generating electric energy using heat from the second heat carrier after the second heat carrier has been heated to the third temperature.

22. The fuel cell system according to claim 14, wherein the first heat carrier includes isopropyl alcohol, acetone, and hydrogen gas, and the second heat carrier includes methylcyclohexane, toluene, and hydrogen gas.

23. The fuel cell system according to claim 14, wherein the first heat pump circuit further includes a first heat exchanger to transfer heat from the first heat carrier at a location downstream of the first exothermic device to the first heat carrier at a location upstream of the first exothermic device, wherein at least some of the heat produced by the first exothermic device is used to preheat the first heat carrier before the first heat carrier is supplied to the first exothermic device.

24. The fuel cell system according to claim 14, wherein the second heat pump circuit further includes a second heat exchanger to transfer heat from the second heat carrier at a location downstream of the second exothermic device to the second heat carrier at a location upstream of the second exothermic device, wherein at least some of the heat produced by the second exothermic device is used to preheat the second heat carrier before the second heat carrier is supplied to the second exothermic device.

* * * * *